PERMANENT STORAGE WIRE SCREEN MEMORY APPARATUS

Filed April 25, 1962

JOHN S. DAVIS
PAUL E. WELLS
INVENTORS

BY Fraser and Bogucki
ATTORNEYS

United States Patent Office 3,239,822
Patented Mar. 8, 1966

3,239,822
PERMANENT STORAGE WIRE SCREEN MEMORY APPARATUS

John S. Davis, Glendale, and Paul E. Wells, Los Angeles, Calif., assignors to Thompson Ramo Wooldridge Inc., Canoga Park, Calif., a corporation of Ohio

Filed Apr. 25, 1962, Ser. No. 190,004
14 Claims. (Cl. 340—174)

This invention relates to information storage arrangements and more particularly to arrangements for storing information on a permanent basis in wire screen arrays.

The storage of information in a manner which makes it readily usable by electrical or mechanical machines has become increasingly important in recent years. Equipment for providing such information storage reliably, compactly and with rapid access is particularly useful in computers, data processing equipment, telephone systems, inventory accounting systems and the like. Much of the needed information is stored in a manner which is more or less transitory. In general such information is written into the memory device by associated access equipment and is subject to erasure or destruction in order that additional data may subsequently be stored in the same device. The storage of information which is subject to change by associated control equipment is designated temporary storage. By contrast, certain information which is useful in the above-mentioned examples is resorted to repeatedly over a considerable time interval without any necessity for changing the stored information. The storage of such information is designated permanent storage. There is thus no need for providing associated control equipment to write information into the memory devices of a permanent storage arrangement so long as one can start with the information already stored, as, for example, during the fabrication of the memory device.

Among the various arrangements which have been developed to serve as information storage devices, a considerable number have utilized the principle of magnetic remanence as the basic mechanism for effecting the retention of applied information signals. Arrangements utilizing this principle have taken many forms in an effort to achieve the desirable characteristics of compactness, reliability, economy and simple, but rapid, access. Among those arrangements which are known are those set forth in our copending application Serial No. 53,008 filed August 30, 1960 now abandoned which pertains to wire screen magnetic memories. As therein disclosed, the wire screen memory comprises a woven screen of conductors upon which a remanently magnetic material is deposited in order to provide a number of magnetic storage cells. While the result is an extremely compact and economical device having the capability of high storage density, the described arrangements are not without problems related to the difficulty of depositing remanently magnetic materials on a wire screen base to achieve suitable uniformity in the finished product. Moreover, the devices thus produced are of the temporary storage type which may be unnecessarily complex when only permanent storage capability is desired.

It is therefore an object of this invention to provide an improved and simplified information storage device.

It is a further object of this invention to provide an information storage device utilizing a simplified wire screen memory as a magnetic storage medium.

More particularly it is an object of this invention to provide a wire screen memory array suitable for storing information on a permanent basis.

An additional object of this invention is to provide a wire screen memory array which does not require a remanent magnetic material for a storage medium.

Briefly, these and other objects are accomplished in accordance with the aspects of this invention by exemplary wire screen arrangements which are so coated with magnetic material and have interrogation and sensing conductors so arranged as to provide coupling at selected screen positions between the interrogation and sensing conductors. By considering the presence of coupling to signify a first storage state and the absence of coupling to signify a second storage state, an exceedingly efficient, simplified and improved permanent storage device is obtained.

More specifically, in a first exemplary device the selective coupling is provided by a selective threading of the interrogation and sensing conductors on a wire screen which has its structural members entirely coated with magnetic material. The threading is such that particular pairs of interrogation and sensing conductors are inductively linked at positions of the screen selected to indicate a first or coupled storage state while no inductive linkage is provided between interrogation and sensing conductors at positions selected to indicate a second or noncoupled storage state. Where coupling is provided, an interrogation signal produces an output signal on the coupled sensing conductor. Where no coupling is provided, an interrogation signal produces no output signal on the associated sensing conductor. Thus, in this arrangement in accordance with the invention the selective coupling is accomplished during the weaving process in selectively threading or not threading magnetic screen openings with both interrogation and sensing conductors to provide an inductive coupling thereat.

In a second exemplary device, a screen of uniform weave pattern is utilized, and interrogation and sensing conductors are woven to thread screen openings at all conductor crossings. Selective coupling is accomplished by providing magnetic material only at selected positions of the screen. As with the first device, coupling between interrogation and sensing conductors via the magnetic material at the conductor crossings may be considered to signify a first storage state while lack of coupling due to the absence of magnetic material at a given crossing may be considered to signify a second storage state.

It should be noted that the selective coupling principle of this invention allows the utilization of the transformer qualities of the magnetic material to the fullest without placing constraining tolerances on the other properties of the material. Since coupling and non-coupling signify the two storage states, minor variations in the levels of coupling at different positions representing the same storage state have a relatively insignificant effect. Thus the limitations imposed as to the overall quality and uniform properties of magnetic material utilized in the formation of screen memory arrangements are substantially relaxed with a corresponding economic saving.

Furthermore, it will be appreciated that information stored in the manner described in accordance with the invention is truly permanent and is not subject to alteration by power failures, electromagnetic field interference, extreme temperature fluctations, or the like which are likely to interfere with the reliable storage of information in magnetic storage devices dependent upon the principle of magnetic remanence. At the same time a compactness and economy of storage are achieved which have not been hitherto available in known assemblies with individual storage elements.

The invention will be more clearly understood from the following detailed description and the accompanying drawings in which like elements have been designated in a like manner and in which.

Figures 1, 2, 3, 4:
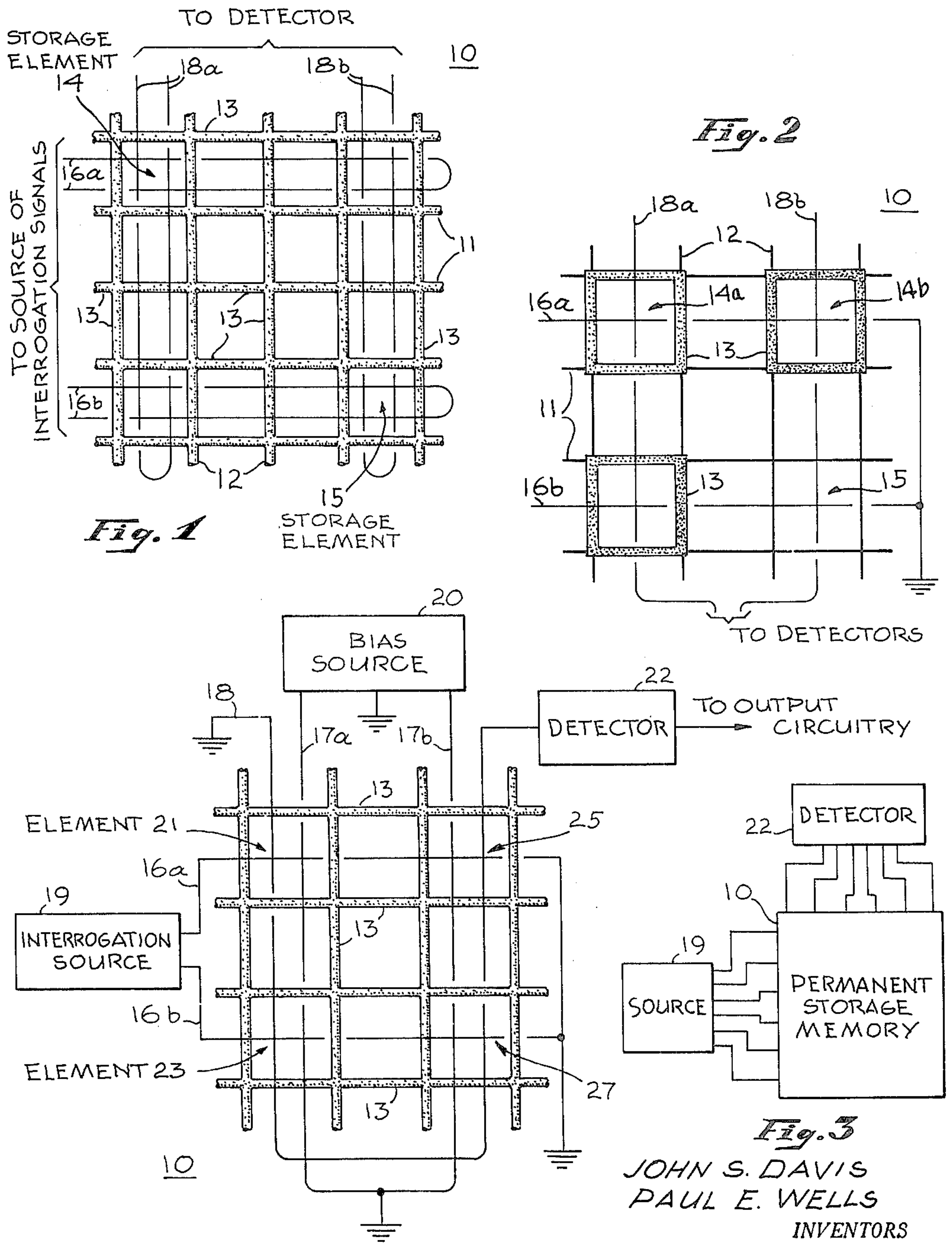
FIGURE 1 represents one particular arrangement of the invention utilizing a specific weaving pattern to provide selective coupling.
FIGURE 2 represents another particular arrangement of the invention utilizing a specific configuration of magnetic material to provide selective coupling.
FIGURE 3 is a block diagram of a system for utilizing the arrangments of FIGS. 1 and 2.
FIGURE 4 is a combination block and schematic diagram of a particular circuit ararngement in accordance with the invention.

Referring to FIG. 1, there is shown a wire screen permanent memory arrangment comprising a plurality of horizontal wires 11 and vertical wires 12 forming a screen 10. The screen 10 (including wires 11 and 12) forms the basic physical structure upon which the permanent memory is arranged. It should be understood that the screen 10 may be constructed of other than vertical and horizontal wires 11 and 12 without departing from the concepts of the present invention. For example, various loop patterns of screen may be found more desirable in certain instances.

The screen 10 may be prepared for use as a memory device by first plating or otherwise coating the wires 11 and 12 with a material such as a nonmagnetic metal whereby all of the wires are joined at the intersections in an equipotential shielding arrangement. This complete bonding of the wires at the intersections facilitates the formation of suitable magnetic coupling paths encircling the individual screen openings and thus aids in coupling signals at appropriate positions.

After the nonmagnetic bonding coating has been applied, the wires 11 and 12 of FIG. 1 may be coated with a magnetic material designated generally as 13 by any one of a number of well-known processes. For example, known electroplating methods may be utilized, as may any other method which provides a substantially uniform coating of magnetic material over the screen 10. After the screen 10 has been coated with magnetic material 13, suitable insulated interrogation conductors 16 and sensing conductors 18 may be woven therein in a preselected pattern to provide the selective coupling indicative of the appropriate information.

Each point in the magnetic screen memory arrangement at which an interrogation conductor 16 and a sensing conductor 18 cross may be considered a storage element. In the arrangement of FIG. 1, the particular bit of information to be stored determines whether both the interrogation conductor 16 and the sensing conductor 18 thread the magnetic path of the storage element or whether one or both of the two conductors cross without threading. To preclude inductive coupling between interrogation and sensing conductors at a particular storage element in this arrangement, only one of the two conductors need pass the element without threading the opening.

The respective directions in which in interrogation conductor 16 and a sensing conductor 18 pass through a given storage element need not be the same, relative to each other, in each case if a bipolar signal detector is employed for receiving signals from the sensing conductors 18. However, a unipolar signal detector may be employed if care is taken to insure that those conductors threading the respective storage elements always do so with the same relative sense so that signals of only one polarity are developed in response to interrogation signals of a given polarity.

Additional coupling between interrogation conductors 16 and sensing conductors 18 may be effected by doubling each conductor back on itself as a return path. Thus for each interrogation conductor an effect of twice the current is achieved while for each sensing winding an induced voltage of twice the amplitude is developed. This is shown in the example in accordance with the invention represented in FIG. 1. In such an arrangement, of course, care must be taken to maintain the appropriate direction of the respective conductors relative to the others in threading a particular storage element. If desired, this effect may be multiplied by looping the respective conductors a number of times about the arrangement shown to further increase the efficiency of operation.

One particular way of providing the arrangement of FIG. 1 in accordance with the invention utilizes a Jacquard loom, or modified standard cloth or wire looms, for weaving the insulated conductors 16, 18 in a preselected pattern. A Jacquard loom is used in the weaving industry because of its ability to produce a variety of woven patterns in accordance with different programmed control signals. By the use of such a loom, the entire screen arrangement including the conductors 16, 18 may be woven in one operation. After the weaving is accomplished, the screen may be coated with nonmagnetic material to provide a base for a magnetic material and have a magnetic coating applied to provide the completed device. In an arrangement produced in this manner, the insulation of the conductors 16, 18 not only serves to provide electrical isolation between the conductors and the remainder of the structure, but also prevents magnetic coating from being deposited on the conductors 16, 18 and possibly establishing undesired inductive couplings.

The pattern chosen for threading the conductors 16 and 18 provides the permanent information storage of the arrangement 10. In the example of FIG. 1, a pair of particular storage elements 14 and 15 may be used in describing the operation of the information storage arrangements. The magnetic material 13 immediately surrounding the elements 14 and 15 will couple signals between the interrogation and sensing conductors 16 and 18 only if those conductors are both threading the associated storage element. For example, it will be noted that the conductors **16*a* and 18*a* thread the element 14 so that an effective inductive coupling is provided between the two. Thus, an interrogation signal on the conductor 16*a* will be coupled to the conductor 18*a* to produce a first storage state indication, hereinafter termed a binary "1." On the other hand, the interrogation and sensing conductors 16*b* and 18*b* do not thread the storage element 15, so an interrogation signal will not be coupled from the conductor 16*b* to the sensing conductor 18*b*. The absence of coupling may be interpreted as a second storage state indication, hereinafter termed a binary "0." In this manner, a permanent memory device is provided. By applying individual interrogation signals from an associated signal source to conductors 16 in a selective manner and by detecting signals appearing on all of the sensing conductors 18, a word line (i.e., the information stored in all storage elements associated with a single interrogation conductor 16) may be interrogated to derive the information stored therein. Alternatively, by detecting signals on only a single sensing conductor 18 during an interrogation by a selected conductor 16**, the particular bit of information stored in a single storage element may be derived.

It will be noted that adjacent storage elements are separated by spaces comprising one or more screen apertures. Such arrangements are desirable to eliminate unwanted magnetic coupling between storage elements and also to provide room for the respective conductors to pass from one side of the screen to the other without threading a particular storage element. Such may be necessary for particular patterns of stored information in order to preserve the proper sense between conductors in threading the appropriate storage elements.

Various changes may be found expedient to adapt the arrangement of the circuit of FIG. 1 to particular situations. Where it is desirable to make more complete use of the magnetic storage device, it may be found useful to coat the screen 10 with magnetic material having substantially rectangular hysteresis properties and to utilize biasing conductors for eliminating undesirable signal transfer. Such an arrangement will be more completely discussed with reference to FIG. 4 hereinafter.

Referring to FIG. 2, there is shown a second circuit in accordance with the invention comprising a screen 10 including horizontal and vertical structural wires 11 and 12, respectively, interrogation conductors 16 and sensing conductors 18. After the device is bonded with a nonmagnetic material (as explained with reference to FIG. 1) magnetic material 13 is deposited on the screen 10 at preselected positions only to establish the desired pattern of coupling beween the interrogation conductors 16 and the sensing conductors 18. In this arrangement of the invention a uniform weave pattern is employed with the storage elements being threaded by the respective conductors at each crossing thereof. The selective provision of magnetic material 13 achieves the desired coupling at particular storage elements in accordance with the information being stored. Thus, coupling is provided between interrogation conductors 16 and sensing conductors 18 in the arrangement of FIG. 2 in each of the storage elements except the storage element 15. Consequently an interrogation signal applied to a conductor 16*a* induces signals on each of the conductors 18*a* and 18*b* because of the coupling provided by the magnetic material 13 at the storage elements 14*a* and 14*b*. In the case of the storage element 15, however, although the conductors 16*b* and 18*b* both thread the opening thereof, no magnetic material 13 is provided at the storage element 15 and thus a signal on the interrogation conductor 16*b* will not be coupled to the sensing conductor 18*b*. As with the arrangement of FIG. 1, the presence of coupling at a particular storage element may be considered to indicate a binary "1" state while the absence of coupling thereat may be considered to indicate a stored binary "0."

The arrangement illustrated in FIG. 2 may, like that of FIG. 1, be operated to provide word or bit oriented readout depending on whether a single one or all of the conductors 18 are connected to detection means during receipt of an interrogation signal on a selected conductor 16. It should be noted that the provision of magnetic material at discrete storage elements may be accomplished by a number of well-known processes. For example, the material may be coated over the entire screen 10, then selectively etched away after masking particular portions to provide magnetic material for the selective coupling at the appropriate storage elements.

In FIG. 3 a general system for utilizing specific arrangements of the invention as shown in FIGS. 1 and 2 is represented in block diagram form. In FIG. 3 a permanent storage wire screen memory 10 is shown having one set of connections to an interrogation source 19 and a second set of connections to a detector 22. As described in connection with FIGS. 1 and 2, interrogation pulses selectively applied from the source 19 induce a pattern of readout pulses on the leads connected to the detector 22 in accordance with the particular information stored in the respective storage elements of the memory 10 as the presence or absence of inductive coupling. It should be understood that the storage arrangements in accordance with the invention are not limited to any particular size or number of individual storage elements, but may have as many such elements and associated conductors as desired. Additional storage capacity may be provided by extending the storage arrangement in the manner previously shown in the depicted arrangements.

In FIG. 4 there is illustrated a combination block and schematic diagram of an arrangement utilizing a permanent wire screen memory device in accordance with the invention. A source of interrogation signals 19 is connected to each of the interrogation conductors 16. The source 19 may comprise any well-known circuit for selectively applying a signal to a chosen conductor 16; for example, individual switches may be arranged to connect each of the conductors 16 to a current source in a particular sequence. As outlined above, it may be desirable to utilize magnetic material surrounding closely-adjacent screen openings in order to provide an increased density of information storage in a given screen 10. Unfortunately, however, where the entire screen 10 is coated with magnetic material, the possibility of unwanted cross-coupling between interrogation and sensing conductors is introduced. Thus, an interrogation signal applied at an unthreaded storage element may produce a spurious signal on a particular sensing conductor which should experience a binary "0" indication.

The particular embodiment of the invention shown in FIG. 4 achieves simplification of the associated control circuitry with increased storage density and improved rejection of spurious signal interference. The screen memory of FIG. 4 utilizes a magnetically remanent material having a substantially rectangular hysteresis loop characteristic for the coating of the screen 10. In accordance with this arrangement of the invention, bias currents are applied on bias conductors 17 from a bias source 20 so that the magnetic material 13 may be maintained in a saturated condition. Information read-out is then achieved in serial fashion by sequentially removing the bias currents from the conductors 17, one at a time, while an interrogation pulse is applied to a selected conductor 16. The saturated condition of the biased portion of the screen memory thus precludes undesired cross-coupling of interrogation signals in accordance with the invention. At the same time, the use of a magnetically remanent material as the coating 13 enhances the magnitude of the readout signals by developing a greater change of flux for a given interrogation signal. The amplitude of the noise signals received from unselected storage elements during the interrogation process is advantageously reduced in this arrangement, however. Thus, the signal-to-noise ratio of the readout signals is substantially improved. The advantageous results achieved through the use of a remanent magnetic material in this fashion in conjunction with a bias source 20 as part of the interrogation circuitry may be adapted with equal facility to either of the arrangements of FIGS. 1 and 2 so that the selectively positioned inductive coupling may be provided by selective location of a remanent magnetic material in a uniform pattern of woven conductors or by resort to a particular weave pattern in a uniformly coated magnetic screen.

The interrogation conductors 16 and the sensing conductors 18 of FIG. 4 thread only selected storage elements of the depicted arrangement in accordance with the stored information pattern of binary digits. The single sensing conductor 18 together with the addition of the bias conductors 17 adapts the arrangement of FIG. 4 to bit-oriented readout. In the depicted arrangment, storage elements 21 and 27 are threaded by both interrogation conductors 16 and sensing conductor 18 and thus represent a stored binary "1" while storage elements 23 and 25 are not threaded by sensing conductor 18 and thus represent a stored binary "0." Each of the storage elements 21, 23, 25 and 27 is threaded by a bias conductor 17.

Although there has been described above specific arrangements of permanent storage wire screen memories for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A permanent storage magnetic memory array comprising a wire screen having orthogonal structural members defining a plurality of storage elements, a magnetic coating on said structural members, and a plurality of interrogation conductors and a plurality of sensing conductors selectively threading and not threading the storage elements in accordance with an information storage pattern in order to couple a signal from an interrogation conductor to a sensing conductor when said conductors thread the same storage element.

2. A permanent storage wire screen memory array comprising a screen defining a plurality of storage elements, a plurality of interrogating conductors and a plurality of sensing conductors threading the screen at predetermined openings thereof, and magnetic material selectively deposited upon said screen at predetermined ones of said storage elements threaded by both the interrogation and the sensing conductors and not deposited at others of said storage elements.

3. A memory array of elements for the permanent retention of information comprising a screen of nonmagnetic material formed by a plurality of interwoven structural members and insulated conductive members, selected ones of the insulated conductive members crossing at openings in the screen; a source of interrogation signals connected to a first group of conductive members; detection means connected to a second group of conductive members; and magnetic material deposited on said screen to provide inductive coupling in a predetermined pattern between members of the first and second groups at only certain elements of said array.

4. A permanent storage memory device comprising a filamentary screen having openings therein, a plurality of horizontal conductors arranged to thread selected openings in the screen, a plurality of vertical conductors arranged to thread selected openings in the screen, and means for providing coupling between the horizontal and the vertical conductors at preselected ones of the openings only and to effectively eliminate coupling at others of the openings.

5. A permanent memory arrangement comprising a structural matrix of nonmagnetic members, a plurality of horizontal conductors threading openings in the matrix, a plurality of vertical conductors threading openings in the matrix, and magnetic material selectively deposited on the matrix at predetermined openings but not at other openings thereof only to establish inductive coupling only between pairs of conductors threading said predetermined openings.

6. A permanent storage memory arrangement comprising a wire screen nonmagnetic members, horizontal and vertical conductors woven into said screen to define a plurality of storage elements, and means including magnetic material deposited on said screen for magnetically coupling the horizontal and vertical conductors at predetermined ones of the storage elements only and for effectively eliminating the coupling at others of the elements.

7. A permanent storage memory arrangement as in claim 6 wherein said means for magnetically coupling the horizontal and vertical conductors includes portions of the conductors arranged in a particular juxtaposition to thread a selected storage element in a particular sense, relative to each other.

8. A permanent storage memory arrangement as in claim 6 wherein said means for magnetically coupling the horizontal and vertical conductors comprises a predetermined arrangement of the magnetic material at only selected storage elements in accordance with information to be stored.

9. A permanent storage magnetic memory array comprising a screen of filamentary members woven in a predetermined pattern, certain of the filamentary members comprising insulated conductive members positioned at selected intervals along the screen, and means for selectively coupling signals applied to a first group of conductive filamentary members to predetermined ones of a second group of conductive filamentary members while effectively blocking said signals from others of said second group.

10. A memory array as in claim 9 wherein the signal coupling means comprises magnetic material deposited on the screen only at predetermined crossing of the conductive filamentary members.

11. A memory array as in claim 9 wherein the signal coupling means includes a uniformly distributed layer of magnetic material with filamentary members of said first and second groups threaded together through only selected portions of the screen in order to provide a pattern of selective coupling between said first and second groups.

12. A memory array as in claim 11 wherein at least a portion of the conductive filamentary members are each folded back on themselves to provide an enhanced output signal via the signal coupling means.

13. A permanent storage memory arrangement comprising a wire screen of horizontal and vertical spaced filamentary members, predetermined ones of the filamentary members at selected intervals of the screen being electrically conductive, means for applying a signal to a selected one of the horizontal conductive filamentary members, means for coupling said signal to only predetermined ones of the vertical conductive filamentary members including magnetic material deposited on said screen enclosing only selected crossings of said horizontal and vertical conductive filamentary members without enclosing the remaining crossings of said filamentary members, and means connected to the vertical conductive members for detecting a signal coupled thereto from a horizontal conductive member, the location of the magnetic material determining the binary information digit which is stored.

14. An information storage device comprising a screen of filamentary members interwoven in a predetermined pattern and non-remanent magnetic material selectively deposited and not deposited thereon to establish coupling between only preselected groups of said filamentary members.

References Cited by the Examiner

UNITED STATES PATENTS

| | | | |
|---|---|---|---|
| 2,877,540 | 3/1959 | Austen | 29—155.5 |
| 2,878,463 | 3/1959 | Austen | 340—174 |
| 2,961,745 | 11/1960 | Smith | 29—155.5 |
| 2,981,932 | 4/1961 | Looney et al. | 340—174 |
| 3,069,661 | 12/1962 | Gianola | 340—174 |
| 3,100,295 | 8/1963 | Schweizerhof | 340—174 |

IRVING L. SRAGOW, *Primary Examiner.*

S. M. URYNOWICZ, *Assistant Examiner.*